Figure 1:
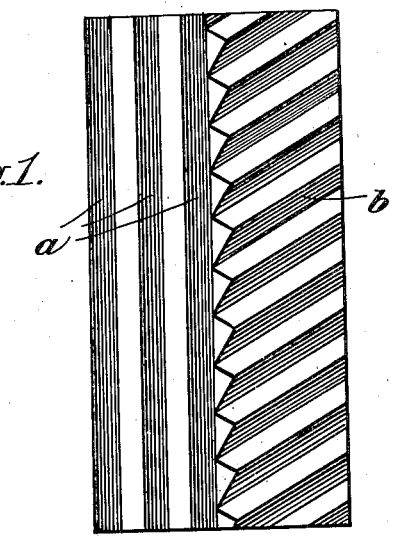

Patented June 16, 1931

1,810,090

UNITED STATES PATENT OFFICE

WILLY SELL, OF WINDELSBLEICHE, NEAR BIELEFELD, GERMANY, ASSIGNOR TO THE FIRM K. & TH. MÖLLER GESELLSCHAFT MIT BESCHRANKTER HAFTUNG, OF BRACKWEDE, WESTPHALIA, GERMANY

FILTERING APPARATUS

Application filed May 23, 1929, Serial No. 365,464, and in Germany June 5, 1928.

My invention relates to devices or apparatus for filtering air and the like, and more particularly to a filtering apparatus of the cellular and revolving types wherein a suitable liquid such as oil is employed for wetting purposes.

In practice for instance a cellular filter of the stated kind composed of a plurality of metallic sheet members having impact and guiding faces for air and gas is dipped into the oily wetting liquid, removed from the latter and hung upon a suitable support so as to be suspended and the liquid allowed to drip off until the sheets and the protuberances and cavities thereof are coated with a fine oil film only. The time required for accomplishing this preparatory treatment of the filter often amounts to more than 24 hours so that reserve cells must be held in stock available and ready for use during that time.

Obviously the employment of filtering devices of the kind set forth is inconvenient and especially objectionable for the long periods of time required for oiling the constituent parts of the filter and allowing the excess of oil to drip off.

The chief object of my invention is to provide a filtering apparatus of the character referred to and equipped with metallic filtering elements or sheets which can be used in connection with the apparatus immediately upon having been immersed into the wetting liquid and which do not entail the danger of oil being taken along with the outflowing purified air. With this and other objects in view I provide according to the present invention counter-current faces on the filtering elements in addition to or besides the usual impact and guiding faces, the said counter-current faces being arranged and adapted to allow of any excess of wetting liquid to flow off within the filtering range that is in the rear of the purified air.

Conformingly in case of a cellular filter the lower frame work of the filtering apparatus must be constructed and shaped to form a room or receptacle for collecting the wetting liquid which has drained from the plates, while in case of a rotary filter, the wetting liquid flows into the purifying trough.

With the above recited and ancillary objects in view reference is had to the following specification and annexed drawings in which there are exhibited a few examples or embodiments of the invention which are in no way intended as a limitation upon the scope of the subjoined claims as it is to be clearly understood that variations and modifications which properly fall within the true scope of the said claims may be resorted to when found expedient. In particular the said counter-faces may be arranged and located in quite a variety of different ways with relation to the impact and guiding faces for the gaseous fluid.

Figure 3:
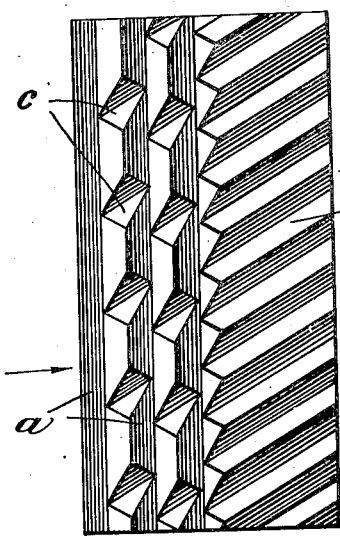
Figure 2:
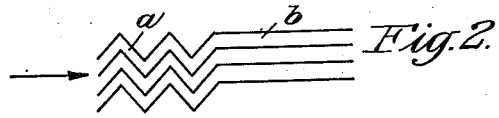
Figure 4:
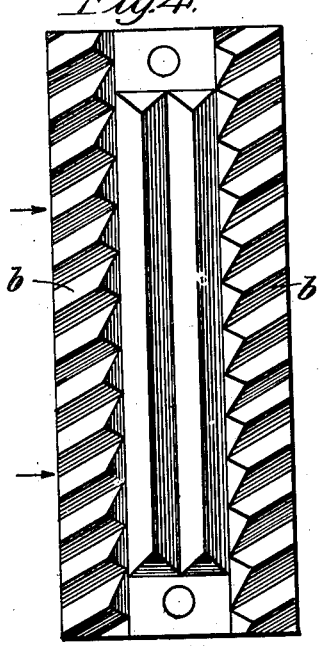
Figure 5:
Figure 7:
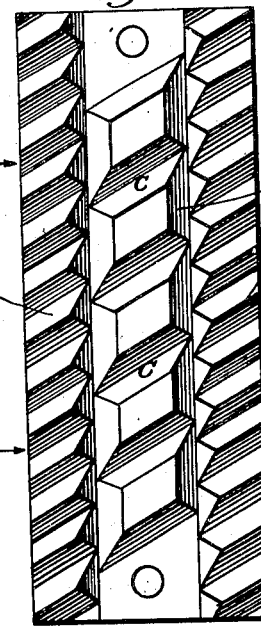
Figure 8:
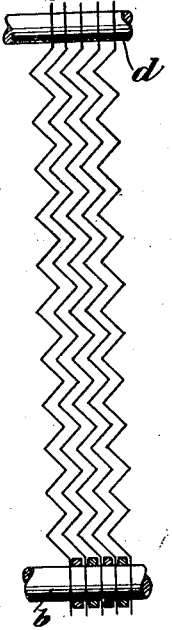
Figure 6:
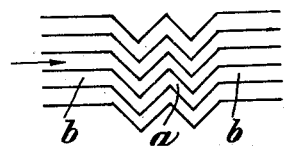

In the accompanying drawings forming a part of this specification and showing for purposes of exemplification a few preferred forms in which the invention may be embodied and practised but without limiting the claimed invention to such illustration instances:

Figure 1 is a view of a filtering sheet constructed according to the present invention, Figure 2 is a view of a cellular filter composed of a series of the filtering sheets shown in Figure 1, Figure 3 is a view similar to Figure 1 of a modified constructional form of the filtering sheet for use in a cellular filter, Figure 4 is a view similar to Figure 1 of a filtering sheet for use in a rotary filter, Figures 5 and 6 are a side view and a view in top plan respectively of a member composed of several sheets constructed or shaped as shown in Figure 4, for use in a rotary filter, Figures 7 and 8 are views similar to Figures 4 and 5 respectively of a modified form of the filtering sheet and the member composed of such sheets.

In the embodiment shown in Figures 1 and 2 the metallic filtering sheet is shaped as usually to form impact and guiding faces $a$ for the gaseous fluid and is further provided with counter-current faces $b$ for conducting the wetting liquid in counter-current direction to a collector, that is to say in a direction opposed to the moving direction of the air or gas current indicated by the arrow in Figure 2. As the air passes the impact faces *a* and comes in contact with the counter-current faces *b*, the oil will be conducted while still within the range or compass of the filter, downwards or towards the left hand in the drawings so as to collect in the collecting receptacle of the frame (not shown).

In the embodiment illustrated in Figure 3 supplementary counter-current faces *c* are provided between the impact and guiding faces *a* so that the excessive oil will be conducted off also within the area occupied by the impact and guiding faces *a* whereof the continuity is interrupted or dissected by the said faces *c*.

In the modification shown in Figures 4 to 6 the impact and guiding faces *a* for air are disposed intermediate between two series of counter-current faces *b* for the discharge of excessive wetting liquid. The sheet shown in Figure 4 is intended for use in a rotary filter and in accordance therewith provided with holes for the reception of suspending pins *d*.

The embodiment shown in Figures 7 and 8 is not distinguished from that illustrated in the Figures 4 to 6 except by the impact and guiding faces *a* disposed between the counter current faces *b*, being interrupted by auxiliary counter-current faces *c*, just as in the embodiment shown in Figure 3.

From the foregoing it is believed that the advantages and novel features of my invention will be readily understood and therefore further detail description is deemed unnecessary.

What I claim is:—

1. An apparatus for filtering air comprising a number of metallic sheets composed to constitute the filtering apparatus impact and guiding faces on the said sheets and counter-current faces thereon for the removal of all excess of wetting liquid into which the apparatus is to be dipped prior to use.

2. A filtering apparatus as claimed in claim 1, wherein the counter-current faces are provided on the sheets in the rear of the impact and guiding faces viewed in the flow direction of the gaseous fluid to be filtered.

3. A filtering apparatus as claimed in claim 1, wherein the continuity of the impact and guiding faces is interrupted by the counter-current faces.

4. A filtering apparatus of the character as claimed in claim 1, wherein the impact and guiding faces are disposed intermediate between the counter-current faces.

5. Air filtering apparatus of the type including baffles coated with a dust-collecting liquid, characterized by the fact that said baffles include angularly-disposed portions constituting means for causing the air stream to take a zig-zag course, and other portions constituting means for directing the air stream upwardly to separate from said air stream dust-collecting liquid entrained therein during the passage of said air stream along said zig-zag course.

6. An air filtering apparatus comprising, a plurality of collecting sheets, each of said sheets having corrugations extending perpendicularly to the direction of the flow of air and other corrugations extending at an acute angle to the direction of flow of air.

7. A filtering apparatus comprising, a plurality of vertically disposed collecting plates, one portion of each of said plates having vertically extending corrugations and an adjacent portion having corrugations extending angularly upward from said first-mentioned portion.

8. As a new article of manufacture, a metallic sheet for use in filtering apparatus of the character referred to, the said sheet having impact faces extending in one direction and counter-current faces extending in a different direction.

9. A metallic sheet for filtering apparatus having a plurality of transverse corrugations at one portion, and at another portion a plurality of corrugations extending at an angle to the first-mentioned corrugations.

In testimony whereof, I affix my signature.

WILLY SELL.